United States Patent [19]

Byrd et al.

[11] 4,337,218
[45] Jun. 29, 1982

[54] METHOD OF CASE BONDING PROPELLANT

[75] Inventors: James D. Byrd, Huntsville, Ala.; Lamar Field, Nashville, Tenn.

[73] Assignee: The United States of America as represented by the Secretary of the Army, Washington, D.C.

[21] Appl. No.: 197,035

[22] Filed: Oct. 15, 1980

[51] Int. Cl.³ ............... C06B 21/00; C06B 45/10
[52] U.S. Cl. ........................ 264/3 R; 102/289; 149/19.9; 156/91; 428/73; 428/86; 428/117; 428/140; 428/223
[58] Field of Search ............... 102/100, 102, 103; 149/19.9; 156/91; 264/3 R; 428/73, 86, 117, 140, 223

[56] References Cited

U.S. PATENT DOCUMENTS

| | | | |
|---|---|---|---|
| 3,338,990 | 8/1967 | Rice et al. | 264/3 R |
| 3,403,484 | 10/1968 | Redey | 428/86 X |
| 3,734,982 | 5/1973 | Sampson | 264/3 R |
| 3,825,465 | 7/1974 | Stock | 428/140 X |
| 4,045,268 | 8/1977 | Geschwender | 428/117 X |
| 4,108,351 | 8/1978 | Hough | 156/290 X |
| 4,131,051 | 12/1978 | Schaffling | 264/3 R X |
| 4,216,039 | 8/1980 | Pierce | 149/19.9 X |
| 4,239,829 | 12/1980 | Cohen | 156/91 X |

Primary Examiner—Edward C. Kimlin
Assistant Examiner—Robert A. Dawson
Attorney, Agent, or Firm—Nathan Edelberg; Robert P. Gibson; Jack W. Voigt

[57] ABSTRACT

A mechanical method of case bonding a solid propellant to a rocket motor case wherein a coating of a liner material is first applied to the internal surface of a rocket motor case. While the liner material is uncured a mechanical structural material selected from wire grid, wire hooks, rubber spikes, steel wool, metal grid, polyamide material, or polypropylene material is embedded in the liner material but allowed to protrude above the liner material. The liner material is allowed to cure, and an uncured propellant composition is cast against the cured liner and allowed to flow around the protruding mechanical structural material. On curing, the propellant composition attaches itself to both the liner and the mechanical structural material. The combination of the liner material, the mechanical reinforcing material, and the propellant composition provides a mechanical reinforcement in the propellant which is held in place with improved tensile adhesion against the rocket motor case wall.

10 Claims, 2 Drawing Figures

METHOD OF CASE BONDING PROPELLANT

DEDICATORY CLAUSE

The invention described herein was made in the course of or under a contract or subcontract thereunder with the Government; therefore, the invention described herein may be manufactured, used, and licensed by or for the Government for governmental purposes without the payment to us of any royalties thereon.

BACKGROUND OF THE INVENTION

A solid propellant grain must be securely fastened in a rocket motor case if problems are to be avoided when the rocket motor is fired. Even when the solid propellant grain appears to be securely bonded to the motor case, problems relating to separation and uncontrolled burning sometimes develop after ignition, and particularly in flight, where the forces caused by acceleration forces and other forces surpass the holding strength of the bonding material between the motor case and the propellant or the holding strength of bonding material between the propellant and liner material.

There is a need for a mechanical method to hold a solid propellant grain in place in addition to a chemical and/or physical bond, i.e., surface adhesion, chemical bonding, surface tension etc., which is generally employed in prior processes.

Therefore, an object of this invention is to provide a mechanical method of fastening a solid propellant grain in a rocket motor case.

A further object of this invention is to provide a mechanical method of fastening a solid propellant grain in a rocket motor case which additionally employs a chemical and/or physical method of fastening a solid propellant grain in a rocket motor case.

SUMMARY OF THE INVENTION

A mechanical method of bonding a solid propellant grain to a rocket motor case comprises the steps of applying an adhesive or liner composition to the internal surface of a rocket motor case or the internal surface of the rocket motor case liner or insulation material, embedding in the liner composition, while the liner is uncured, a mechanical structural material in the form of a wire grid, wire hooks, rubber spikes, steel wool, expanded metal grid, polypropylene fabric, or the like. The embedded mechanical structural material is allowed to protrude above the uncured liner composition. The liner is allowed to gel and cure, and the propellant is cast against the liner and flows around the protruding mechanical structural material. On curing, the propellant attaches itself to both the liner and the mechanical structural material thereby employing the mechanism of mechanical fastening along with chemical and/or physical bonding by surface tension forces and adhesive forces. The cured propellant formed in this manner requires a higher tensile adhesion load to cause failure of the bond securing the propellant grain in the rocket motor case.

BRIEF DESCRIPTION OF THE DRAWING

The FIGURES of the drawing are sectional views of a portion of a rocket motor which illustrate typical approaches, in accordance with this invention, for mechanical bonding of a solid propellant in a rocket motor case.

DESCRIPTION OF THE PREFERRED EMBODIMENTS

An uncured liner material (e.g., comprised substantially of hydroxyl terminated polybutadiene with a inert filler material of carbon black and containing a curative and crosslinking agent of a diisocyanate) is applied to the internal surface of a rocket motor case. Prior to curing the liner material, a mechanical structural material such as a wire grid, wire hook, rubber spikes, steel wool, metal grid or polypropylene fabric is embedded in the uncured liner material, but a portion of the mechanical structural material is allowed to protrude above the uncured liner material. The liner material is allowed to gel or cure, and then a solid propellant composition (e.g., a hydroxyl terminated polybutadiene propellant employing a diisocyanate curing and crosslinking agent) is cast against the cured liner material and allowed to flow around the protruding mechanical structural material. The propellant when cured yields a propellant grain having an improved propellant to case bond. The described method is particularly attractive for use for obtaining improved propellant to case bond for propellants that are difficult to bond to conventional liners. A propellant grain formed as described provides improved bond strength between the propellant grain and the rocket motor case for high acceleration rocket motors.

Figure 1:
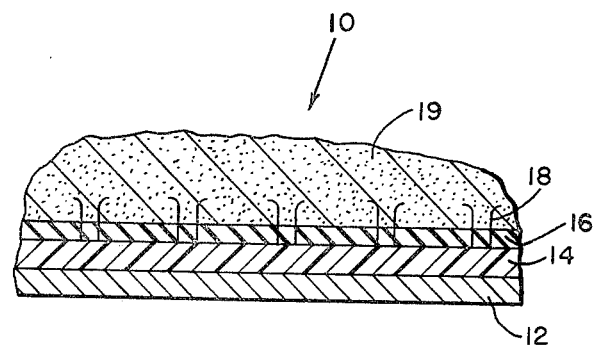

In further reference to the Figures of the drawing, FIG. 1 shows a sectional view 10 of a portion of a rocket motor having a case 12 with insulation material 14 bonded thereto. A mechanical structural material 18 in the form of wire hooks is shown bonded in a cured barrier or liner material 16. A propellant grain 19 is shown which has been cast around the wire hooks, bonded to the wire hooks and to the liner material 16 to form a propellant grain having an improved propellant to case liner bond.

Figure 2:
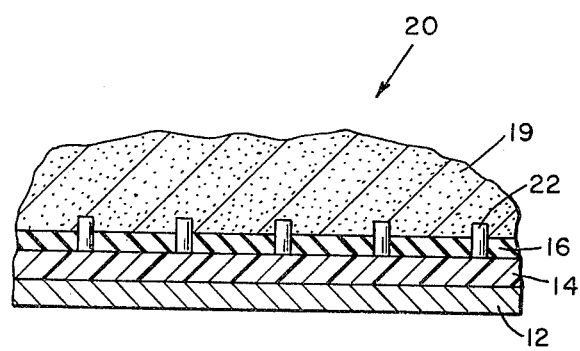

FIG. 2 shows a sectional view 20 of a portion of a rocket motor case with associated parts as numbered in FIG. 1 except FIG. 2 shows another mechanical structural material 22 in the form of rubber spikes. All other like numerals are as described in FIG. 1.

It is understood that if no requirement exists for insulation material, then the liner material is applied to the rocket motor case. The internal surface can mean the surface of the insulation or the surface of the rocket motor case as applicable.

In addition to the mechanical structural materials illustrated in the drawing, additional materials have proven to be useful. Some of the materials have proven to be superior in performance as indicated in Table I which summarizes a mechanical bond study-propellant to case bond.

TABLE I

MECHANICAL BOND STUDY-
PROPELLANT TO CASE BOND
Test Temperature: 77° F.
Strain Rate: 1 inch per minute
Propellant Mix No. 14Q-754

| Mechanical Structural Material and Control | Tensile Adhesion Load psi | Failure* Test Results |
|---|---|---|
| Control TL-H755A** | 44.4 | 2 B + p, 1B |
| Screen, Fine | 77.0 | 3 screen + p |
| Screen, Coarse | 91.8 | 3 screen + p |
| Mesh | 63.2 | 3 mesh + p |
| Phenolic Honeycomb | 69.5 | 3 honeycomb |
| Grating | 92.9 | 3 grading + p |

TABLE I-continued
MECHANICAL BOND STUDY-PROPELLANT TO CASE BOND
Test Temperature: 77° F.
Strain Rate: 1 inch per minute
Propellant Mix No. 14Q-754

| Mechanical Structural Material and Control | Tensile Adhesion Load psi | Failure* Test Results |
| --- | --- | --- |
| Velcro, loops*** | 100.6 | 3 Velcro + p |
| Velcro, hooks*** | 102.4 | 3 Velcro + p |
| Jacks (metal) | 62.4 | 3 Jacks + p |
| Clips (metal) | 36.7 | 3 B, Clip + p |
| Springs (metal) | 67.7 | 3 Springs + p |
| Spheres, glass | 45.3 | 3 Bond + spheres |
| Staples | 74.4 | 3 Staples + p |
| Spikes, rubber**** | 51.4 | 3 Bond |
| Hooks (metal) | 80.5 | 3 Bond |
| Polypropylene Fibers | 132.4 | 3 Fibers + p |
| Screws | 43.2 | 3 Bond |

*3 specimens were tested for each tensile adhesion, failure test.
**Hydroxyl terminated polybutadiene (HTPB) rubber binder, inert filler of carbon black, curative and crosslinking agent of a diisocyanate.
***Polyamide
****Molded from TL-H755A with same type curing and crosslinking agent employed.
B = bond
p = propellant In reviewing the mechanical structural materials of Table I, a wide range of materials are shown to be useful for improving the bond strength and raising the psi load level for tensile adhesion failures to take place. These materials which showed significant contribution include rubber spikes, metallic and nonmetallic materials in the form of fine or coarse screen mesh, and grating, phenolic honeycomb, metal springs and hooks, polyamide loops and hooks, and polypropylene fibers. The preferred nonmetallic materials of construction for screen, mesh, and grating material are polypropylene and polyamide.

The propellant formulation which was used in the evaluation of the mechanical structural materials was a hydroxyl terminated polybutadiene formulation which is conventionally employed as a casting formulation. The main criterion of the propellant is that it be capable of being cast and that it is compatible with the liner formulation and the mechanical structural materials.

The control liner material as shown in Table I serves as the base of comparison at which tensile adhesion fails. For example, at a psi load of 44.4 for the control two failures of the bond plus propellant occurred while one failure at the bond interface occurred. The highest psi load for failure (132.4) occurred when employing polypropylene fibers as the mechanical structural material. Three failures were observed on three samples evaluated which included fibers plus propellant. In other words, the strength of the bond between the propellant, the mechanical structural material, and the motor case was so secure that to cause failure, a load sufficiently high enough to tear the polypropylene fibers and the propellant apart was required. In an actual flight environment, this value would indicate that a rocket motor having this strength of propellant to case bond would meet the requirements for high acceleration use where the rocket motor would be subjected to high G values. Although the control propellant for tensile adhesion failure test where failure occurred at 44.4 is considered an acceptable bond for many rocket motors, the use of mechanical structural material provides a wider margin of reliability for the high performance rocket motors. The level to which the rocket motor could perform is considered directly related to the level of tensile adhesion load required to cause a propellant bond to case failure or combination of bond and/or propellant failures.

A mechanical structural material employed in accordance with this invention increases the shear strength; therefore, the mode of failure due to low shear strength is lessened. Also, the modes of other failures, such as by peeling or other separations, are lessened by the use of the disclosed mechanical structural materials.

We claim:

1. A mechanical method of case bonding a solid propellant to a rocket motor case to achieve an improved propellant bond to case strength, said method comprising:
   (i) applying a layer of an uncured liner composition to the internal surface of a rocket motor case;
   (ii) embedding a mechanical structural material that is compatible with said liner formulation and the solid propellant composition which is to be cast against said uncured liner composition after said liner composition is cured with a portion of said mechanical structural material protruding above said cured liner composition, said mechanical structural material being in a predetermined form in said uncured liner composition and allowing a portion of said mechanical structural material to protrude above said uncured liner composition;
   (iii) curing said liner composition;
   (iv) casting a solid propellant composition against the cured liner composition and around said protruding portion of mechanical structural material; and,
   (v) curing said solid propellant composition to yield a solid propellant grain that is characterized by an improved propellant bond to case strength, said propellant bond to case strength being further characterized by said solid propellant grain having the mode of failures due to low shear strength, peeling, and separations which are lessened as compared with a similarly case bonded solid propellant grain which does not employ said mechanical structural material.

2. The method of claim 1 wherein said mechanical structural material is in the form of rubber spikes which are embedded in said uncured liner composition, said uncured liner composition being comprised substantially of hydroxyl terminated polybutadiene with an inert filler of carbon black and a curative and crosslinking agent of a diisocyanate, and wherein said solid propellant composition that is cast against said cured liner composition and around said protruding portions of said mechanical structural material is a hydroxyl terminated polybutadiene propellant composition employing a diisocyanate curing and crosslinking agent.

3. The method of claim 1 wherein said mechanical structural material is in the form of polypropylene fibers which are embedded in said uncured liner composition, said uncured liner composition being comprised substantially of hydroxyl terminated polybutadiene with an inert filler of carbon black and a curative and crosslinking agent of a diisocyanate, and wherein said solid propellant composition that is cast against said cured liner composition and around said protruding portions of said mechanical structural material is a hydroxyl terminated polybutadiene propellant composition employing a diisocyanate curing and crosslinking agent.

4. The method of claim 1 wherein said mechanical structural material is in the form of polyamide hooks and loops which are embedded in said uncured liner composition, said uncured liner composition being comprised substantially of hydroxyl terminated polybutadiene with an inert filler of carbon black and a curative and crosslinking agent of a diisocyanate, and wherein said solid propellant composition that is cast against said cured liner composition and around said protruding portions of said mechanical structural material is a hydroxyl terminated polybutadiene propellant composition employing a diisocyanate curing and crosslinking agent.

5. The method of claim 1 wherein said mechanical structural material is in the form of phenolic honeycomb which is embedded in said uncured liner composition, said uncured liner composition being comprised substantially of hydroxyl terminated polybutadiene with an inert filler of carbon black and a curative and crosslinking agent of a diisocyanate, and wherein said solid propellant composition that is cast against said cured liner composition and around said protruding portions of said mechanical structural material is a hydroxyl terminated polybutadiene propellant composition employing a diisocyanate curing and crosslinking agent.

6. The method of claim 1 wherein said mechanical structural material is in the form of metallic grating which is embedded in said uncured liner composition, said uncured liner composition being comprised substantially of hydroxyl terminated polybutadiene with an inert filler of carbon black and a curative and crosslinking agent of a diisocyanate, and wherein said solid propellant composition that is cast against said cured liner composition and around said protruding portions of said mechanical structural material is a hydroxyl terminated polybutadiene propellant composition employing a diisocyanate curing and crosslinking agent.

7. The method of claim 1 wherein said mechanical structural material is in the form of metallic screen which is embedded in said uncured liner composition, said uncured liner composition being comprised substantially of hydroxyl terminated polybutadiene with an inert filler of carbon black and a curative and crosslinking agent of a diisocyanate, and wherein said solid propellant composition that is cast against said cured liner composition and around said protruding portions of said mechanical structural material is a hydroxyl terminated polybutadiene propellant composition employing a diisocyanate curing and crosslinking agent.

8. The method of claim 1 wherein said mechanical structural material is in the form of polyamide screen which is embedded in said uncured liner composition, said uncured liner composition being comprised substantially of hydroxyl terminated polybutadiene with an inert filler of carbon black and a curative and crosslinking agent of a diisocyanate, and wherein said solid propellant composition that is cast against said cured liner composition and around said protruding portions of said mechanical structural material is a hydroxyl terminated polybutadiene propellant composition employing a diisocyanate curing and crosslinking agent.

9. The method of claim 1 wherein said mechanical structural material is in the form of metallic springs which are embedded in said uncured liner composition, said uncured liner composition being comprised substantially of hydroxyl terminated polybutadiene with an inert filler of carbon black and a curative and crosslinking agent of a diisocyanate, and wherein said solid propellant composition that is cast against said cured liner composition and around said protruding portions of said mechanical structural material is a hydroxyl terminated polybutadiene propellant composition employing a diisocyanate curing and crosslinking agent.

10. The method of claim 1 wherein said mechanical structural material is in the form of polyamide grating which is embedded in said uncured liner composition, said uncured liner composition being comprised substantially of hydroxyl terminated polybutadiene with an inert filler of carbon black and a curative and crosslinking agent of a diisocyanate, and wherein said solid propellant composition that is cast against said cured liner composition and around said protruding portions of said mechanical structural material is a hydroxyl terminated polybutadiene propellant composition employing a diisocyanate curing and crosslinking agent.

* * * * *